United States Patent
Luo et al.

(10) Patent No.: US 7,130,474 B2
(45) Date of Patent: Oct. 31, 2006

(54) METHOD AND SYSTEM FOR GENERATING DIGITAL IMAGE FILES FOR A LIMITED DISPLAY

(75) Inventors: Jiebo Luo, Pittsford, NY (US); Gustav Braun, Fairport, NY (US); Christophe Papin, Paris (FR)

(73) Assignee: Eastman Kodak Company, Rochester, NY (US)

( * ) Notice: Subject to any disclaimer, the term of this patent is extended or adjusted under 35 U.S.C. 154(b) by 834 days.

(21) Appl. No.: 10/259,538

(22) Filed: Sep. 27, 2002

(65) Prior Publication Data

US 2004/0062437 A1    Apr. 1, 2004

(51) Int. Cl.
G06K 9/36    (2006.01)
(52) U.S. Cl. ..................................... 382/239
(58) Field of Classification Search ............... None
See application file for complete search history.

(56) References Cited

U.S. PATENT DOCUMENTS

| | | | | |
|---|---|---|---|---|
| 5,208,871 | A | * | 5/1993 | Eschbach .................... 382/252 |
| 5,486,826 | A | * | 1/1996 | Remillard ..................... 341/51 |
| 5,649,083 | A | * | 7/1997 | Barkans et al. ............ 345/597 |
| 5,710,833 | A | | 1/1998 | Moghaddam et al. ....... 382/228 |
| 5,790,131 | A | | 8/1998 | Liang et al. |
| 5,901,245 | A | | 5/1999 | Warnick et al. ............. 382/190 |
| 5,901,276 | A | * | 5/1999 | Murahashi et al. ......... 358/1.13 |
| 5,930,398 | A | * | 7/1999 | Watney ...................... 382/239 |
| 6,094,510 | A | * | 7/2000 | Yaguchi et al. ............. 382/232 |
| 6,195,462 | B1 | | 2/2001 | Bryniarski et al. |
| 2002/0016818 | A1 | | 2/2002 | Kirani ......................... 709/203 |
| 2002/0031276 | A1 | * | 3/2002 | Yagishita et al. ........... 382/252 |
| 2002/0106130 | A1 | | 8/2002 | Yokonuma |

FOREIGN PATENT DOCUMENTS

JP    02000244751 A  *  9/2000

OTHER PUBLICATIONS

"Joint quantization and error diffusion of colour images using competitive learning," Scheunders, P., IEE Proc.-Vis. Image Signal Process, vol. 145, No. 2, Apr. 1998, pp. 137-140.*

(Continued)

Primary Examiner—Wenpeng Chen
(74) Attorney, Agent, or Firm—David M. Woods

(57) ABSTRACT

A method for processing a digital color image for display and transmission includes the steps of (a) resizing the image to a lower display resolution to produce a display-sized image, (b) quantizing the display-sized image to a display palette with an error diffusion process to produce an error diffused image, (c) losslessly compressing the error diffused image to produce a compressed image having a particular file size, (d) comparing the file size to a maximum file size and if less than the maximum file size, transmitting the digital image to the display; (e) if the file size is greater than the maximum file size but less than a another predetermined file size, reducing the error diffusion rate by a predetermined amount in order to reduce the file size; and (f) if the file size is greater than the maximum file size and the predetermined file size, simplifying the resized image by reducing image detail to produce a simplified image and repeating the preceding steps on the simplified image.

20 Claims, 5 Drawing Sheets

OTHER PUBLICATIONS

"Reduced-rate block truncation coding of image using error diffusion," Webb, J. L. H., et al., IEEE Signal Processing Letters, vol. 2, No. 4, Apr. 1995, pp. 68-69.*

"Quantization and multilevel halftoning of color images for near original image quality" by R.S. Gentile, E. Walowit and J.P. Allebach. *J. Opt. Soc. Am.* A7, pp. 1019-1026, 1990.

"Digital halftoning" by P.G. Roetling and R.P. Loce in *Digital Image Processing Methods*, Ed. by E. Dougherty. New York; Marcel Dekker, 1994.

"Digital Image Smoothing and the Sigma Filter" by L. Lee. *Computer Vision, Graphics, Image Processing*, vol. 24, pp. 189-198, Apr. 1983.

Artifacts removal in low bit rate compressed images, by J. Luo, C.W. Chen, K.J. Parker, and T.S. Huang. *IEEE Trans. Image Processing*, vol. 5, 1996, pp. 1363-1368.

"Face Detection in Still Gray Images" by B. Heisele, T. Poggio, M. Pontil, MIT Artificial Intellignce Lab, Memo 1687, May 2000.

* cited by examiner

METHOD AND SYSTEM FOR GENERATING DIGITAL IMAGE FILES FOR A LIMITED DISPLAY

FIELD OF THE INVENTION

This invention relates to the field of digital imaging, and more particularly to a method for generating a digital file for representing a digital color image using a limited palette of color values.

BACKGROUND OF THE INVENTION

Many color image output devices are not capable of displaying all of the colors in an input digital image due to the fact that they must be stored in a memory buffer with a reduced bit-depth. Likewise, it may also be desirable to represent an image using a reduced bit-depth in order to reduce the amount of bandwidth needed for the transmission of an image, or the amount of memory needed to store an image. For example, many computers may use an 8-bit or a 16 bit color representation to store an image that is to be displayed on a soft-copy display such as a CRT or an LCD screen. Such representations allow only 256 and 65,536 unique color values, respectively. This is significantly less than the 16,777,216 possible color values associated with a typical 24-bit color image that is conventionally used in many digital imaging applications.

In applications where it is necessary to represent an input image using a reduced number of colors, it is necessary to determine the set of colors to be included in the reduced set of colors. In some cases, a reduced set of colors may be determined ahead of time independent of the particular image being encoded. For example, 3-bits of color information (8 different levels) may be used for the red and green channels of an image, and 2-bits of color information (4 different levels) may be used for the blue channel of an image. This produces a lattice of 8×8×4=256 different color values that can be used to represent the input image using an 8-bit representation. The input digital image can be converted to the 8-bit representation simply by taking the highest 2- or 3-bits of each of the corresponding RGB channels. The result is an image that has quantization errors that can produce visible contours in the image in many circumstances. This color palette is referred to as the 3-3-2 palette and is used in a number of wireless devices such as the Ericsson T68 cell phone.

One method for minimizing the visibility of the quantization errors in the reduced bit-depth image is to use a multi-level halftoning algorithm to preserve the local mean of the color value. R. S. Gentile, E. Walowit and J. P. Allebach, "Quantization and multilevel halftoning of color images for near original image quality," *J. Opt. Soc. Am. A* 7, 1019–1026 (1990) described various methods for quantization and multilevel halftoning of color images. One commonly used multi-level halftoning method is called error diffusion. The detail of error diffusion will be discussed later.

In wireless communication, there is usually a limit on the size of the file to be transmitted through the air and received by a targeted wireless device. For example, the current wireless communication standard requires that the file size should not exceed 3 kilo bytes. In the case of the EricssonT68 cell phone, let us assume that one would like to display an image of the size of 96×64 pixels on its color screen. Even after a digital color image is rendered by the 3-3-2 color palette and reduced to 1 byte per pixel, it takes 96×64=6144 bytes to simply store the indices to the color palette. In general, it is undesirable to compress the indices in a lossy fashion because any error in the index value could result in significant color distortion due to indexing error. Therefore, the indices are usually compressed using a lossless file format such as CompuServe GIF, or Portable Network Graphics (PNG) (see www.w3.org./Graphics/PNG), or the upcoming Joint Photographic Network Group recommended format referred to as JPEG 2000 (see www.jpeg.org), by taking advantage of the data redundancy because of correlation in the image structures. In addition, a dithering process such as error diffusion (see P. G. Roetling and R. P. Loce, "Digital halftoning," in Digital Image Processing Methods, E. Dougherty, Ed. New York: Marcel Dekker, 1994.) is frequently employed to alleviate color quantization effect, due to the use of a display palette, in order to produce a visually more pleasing image. Because the image has been reduced to a small size, and more importantly, the amount of correlation is significantly reduced by the error diffusion process, which is of high-pass nature in terms of frequency response, it becomes extremely challenging to achieve the needed compression in order to get the file size below the required 3 kilo bytes. On one hand, compression is required to satisfy the bandwidth limitation. On the other hand, compression (including quantization, and resizing) inevitably reduces the image quality. In short, the requirements for small file size and good image quality are competing constraints.

Conventional systems are generally unable to provide a good solution given similar competing constraints. In U.S. Patent Application Publication No. 2002/0016818 A1, which is entitled "System and Methodology for Optimizing Delivery of Email Attachments for Disparate Devices" and was published on Feb. 7, 2002, Kirani and Whittington disclose system and methodology for optimizing delivery of email attachments for disparate devices. Kirani and Whittington compare the size of attached images to the capabilities of the types of the recipient client device, and pre-empt the delivery of the original format of those attachments if they are determined to be burdensome or overwhelming for the particular recipient device in use. In cases wherein these attachments would strain the capabilities of the recipient device's wireless bandwidth and/or display features, the original attachments are simply removed from the messages and saved in a network media-sharing repository, which can be subsequently accessed via a link (e.g., URL) referencing that storage address. Recipients can specify their wireless handheld device type, and opt to receive transformations of this type of attachment. In cases wherein the recipient has previously used and specified multiple types of client devices, Kirani and Whittington apply a transformation to the current attachment that corresponds to the least capable in the set of those multiple devices. Clearly, this process is cumbersome and the least capable device determines the image quality for all devices.

There is therefore a need to provide a method for rendering and compressing a digital image for display on a display device using a display palette and having a display resolution less than the original image resolution, where the transmission channel also imposes a limit on the maximum file size.

SUMMARY OF THE INVENTION

The present invention is directed to overcoming one or more of the problems set forth above. Briefly summarized, according to one aspect of the present invention, the invention resides in a method for rendering and compressing a digital image for display on a display device, where the display device has a display resolution less than the resolution of the digital image, uses a display palette for rendering the digital image, and connects with a transmission channel that imposes a limit on a maximum file size. The method includes the steps of (a) resizing the digital image to the display resolution to produce a display-sized image; (b) quantizing the display-sized image to the display palette with an error diffusion process that produces an error diffused display-sized image, where the error diffusion process has an initial error diffusion rate; (c) losslessly compressing the error diffused display-sized image to produce a compressed display-sized image having a particular file size; (d) comparing the particular file size to the maximum file size and, if the file size is less than the maximum file size, transmitting the display-sized image to the display; (e) if the particular file size is greater than the maximum file size, but less than another predetermined file size that is greater than the maximum file size, reducing the error diffusion rate by a predetermined amount in order to reduce the file size and then repeating steps subsequent to step (a) on the resized image at the reduced error diffusion rate; and (f) if the particular file size is greater than both the maximum file size and the predetermined file size, simplifying the resized image by reducing image detail to produce a simplified image and then repeating steps subsequent to step (a) on the simplified image until the particular file size is less than the maximum file size.

The present invention has the advantage that the visual quality of the image represented by a digital image file of a size closest to the maximum file size is the highest possible, in the sense that the visual distortion due the quantization by a fixed device palette will be minimized and the prominent image structures are preserved.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing algorithms for generating digital files for use with a display device are well known, the present description will be directed in particular to attributes forming part of, or cooperating more directly with, the method and system in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method and system as described according to the invention in the following materials, software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 3:
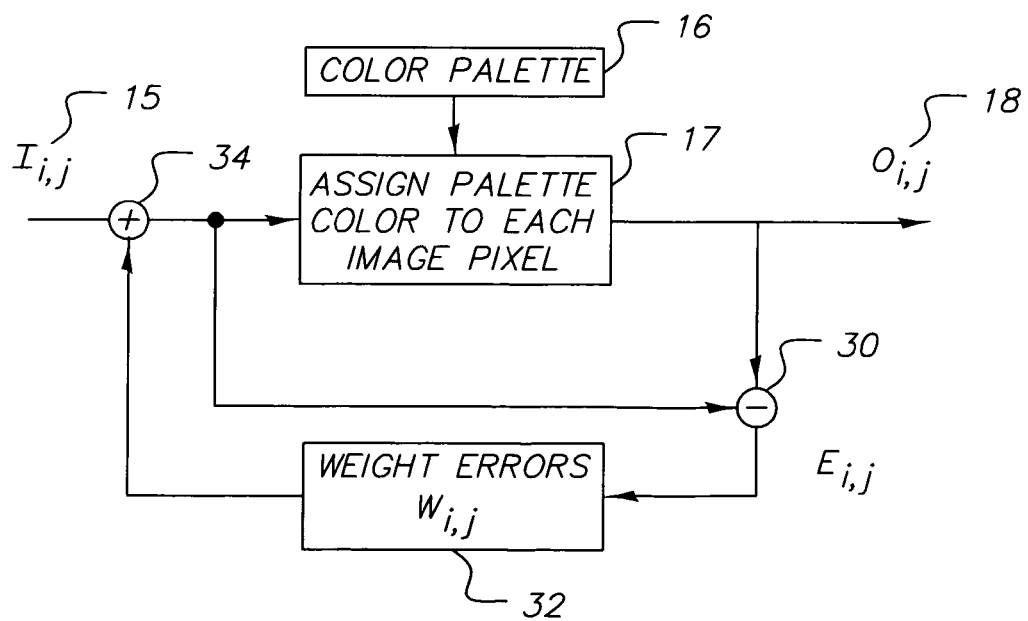
FIG. 3 is a diagram showing a known multi-level vector error diffusion process.

One of the known techniques for generating digital files for use with a display device is multi-level halftoning. Multi-level halftoning algorithms can be used to create the appearance of color values intermediate to the palette colors by varying the palette values assigned to the pixels of the output digital color image such that a local average color value is preserved. An example of a known multi-level halftoning method that could be used is multi-level vector error diffusion. A flow diagram illustrating a typical multi-level vector error diffusion algorithm is shown in FIG. 3. In this figure, an input pixel color value $I_{i,j}$ of from the $i^{th}$ column and $j^{th}$ row of the input digital color image 15 is processed by assigning a palette color to each image pixel (step 17) to form a corresponding output pixel color value $O_{i,j}$ of the output digital color image 18. Assigning a palette color to each image pixel in step 17 introduces a quantization error. This error is due to the fact that the output pixel value is selected from one of the palette colors in the predetermined set of palette colors 16. A difference operation 30 is used to compute a color error $E_{i,j}$ representing the vector difference between the input pixel color value $I_{i,j}$ and the output pixel color value $O_{i,j}$. A weight errors step 32 is used to apply a series of error weights $W_{i,j}$ to the resulting color error $E_{i,j}$. A sum operation 34 is then used to add the weighted color errors to nearby input pixels that have yet to be processed.

Figure 4:
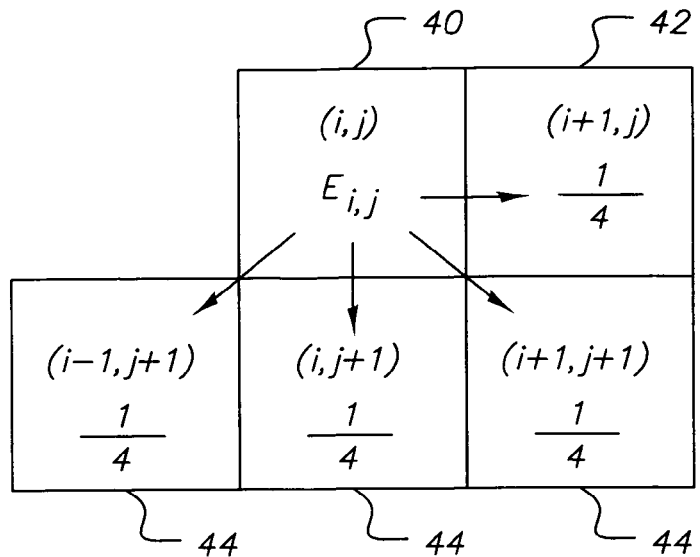
FIG. 4 shows an example set of error weights that can be used for the multi-level vector error diffusion process shown in FIG. 3.

An example set of error weights $W_{i,j}$ is shown in FIG. 4. In this example, the color error $E_{i,j}$ for the current pixel 40 with column and row address (i, j) is weighted by a factor of ¼ and distributed to the next pixel to the right 42 in the current row of the image having the column and row address (i+1, j). Likewise the color error $E_{i,j}$ is also weighted by factors of ¼ and distributed to three pixels in the next row of the image 44 having column and row addresses (i−1, j+1), (i, j+1) and (i+1, j+1). In this way, the quantization errors introduced when processing the current pixel 40 are distributed to nearby input pixels that have not yet been processed. The result is that the local average color value is approximately preserved.

As explained above, when error diffusion is applied in conjunction with the quantization effect, the quantization artifacts are alleviated because of the re-distribution of quantization error to the neighboring pixels. In general, the image looks the best if close to 100% of the quantization error is re-distributed. If the rate of error diffusion is defined as the sum of all weights multiplied by 100, then the preferred goal is to use a high error diffusion rate that is as close to 100% as possible, e.g., 90%. On the other hand, error diffusion introduces high frequency components to the image and therefore reduces the amount of data correlation in the image, making it more difficult to compress the resulting image (i.e., to satisfy the maximum file size requirement). One trade-off is to reduce the percentage of error diffused to the neighboring pixels and thereby to reduce the amount of high frequency component introduced, in turn increasing the amount of data correlation to make it possible to meet the file size requirement. The error diffusion weights $W_{i,j}$ at a given error diffusion rate R can be readily determined by multiplying the weights at the 100% rate by the current error diffusion rate. However, a rule of thumb is that if less than 50% of the quantization error is distributed, the effect of error diffusion is diminished to merely adding noise to the quantized image. Therefore, some alternative way of increasing the data correlation is needed if the error diffusion rate is reduced to 50% and the corresponding file size is still above the limit on maximum file size.

Data correlation can be increased if the less significant details in the image are sacrificed while prominent image structures are preserved. The present invention utilizes a procedure called image simplification to achieve this objective. In particular, it is assumed that low-magnitude spatial variations, regardless of their frequency content, in more or less flat regions, are perceptually less important. Therefore, an edge-preserving spatial smoothing filter, such as the Sigma filter, is suitable for image simplification. For details of the Sigma filter, see J. Lee in "Digital image smoothing and the σ-filter," *Computer Vision, Graphics, Image Processing*, vol. 24, pp. 189–198. April 1983. Conventionally, the Sigma filter is used to remove noise in an image. A nonlinear filter such as the Sigma filter has the advantage of better preserving image details when removing noise than linear filters. A local average of neighboring pixel values that are within a difference of σ of the current pixel value is used to replace the current pixel value. Clearly, edges of large magnitude are preserved this way while noise of low magnitude is removed. Due to its edge-preserving ability, the Sigma filter is a good choice for removing less important image details, but it is not the only edge-preserving filter that could be useful. Other edge-preserving spatial smoothing filters include without limitation the Huber Markov Random Field filter described in J. Luo, C. W. Chen, K. I. Parker, and T. S. Huang, "Artifacts Reduction in Low Bit Rate DCT-Based Image Compression", *IEEE Trans. Image Processing*, Vol. 5, 1996, pp. 1363–1368.

Figure 1:
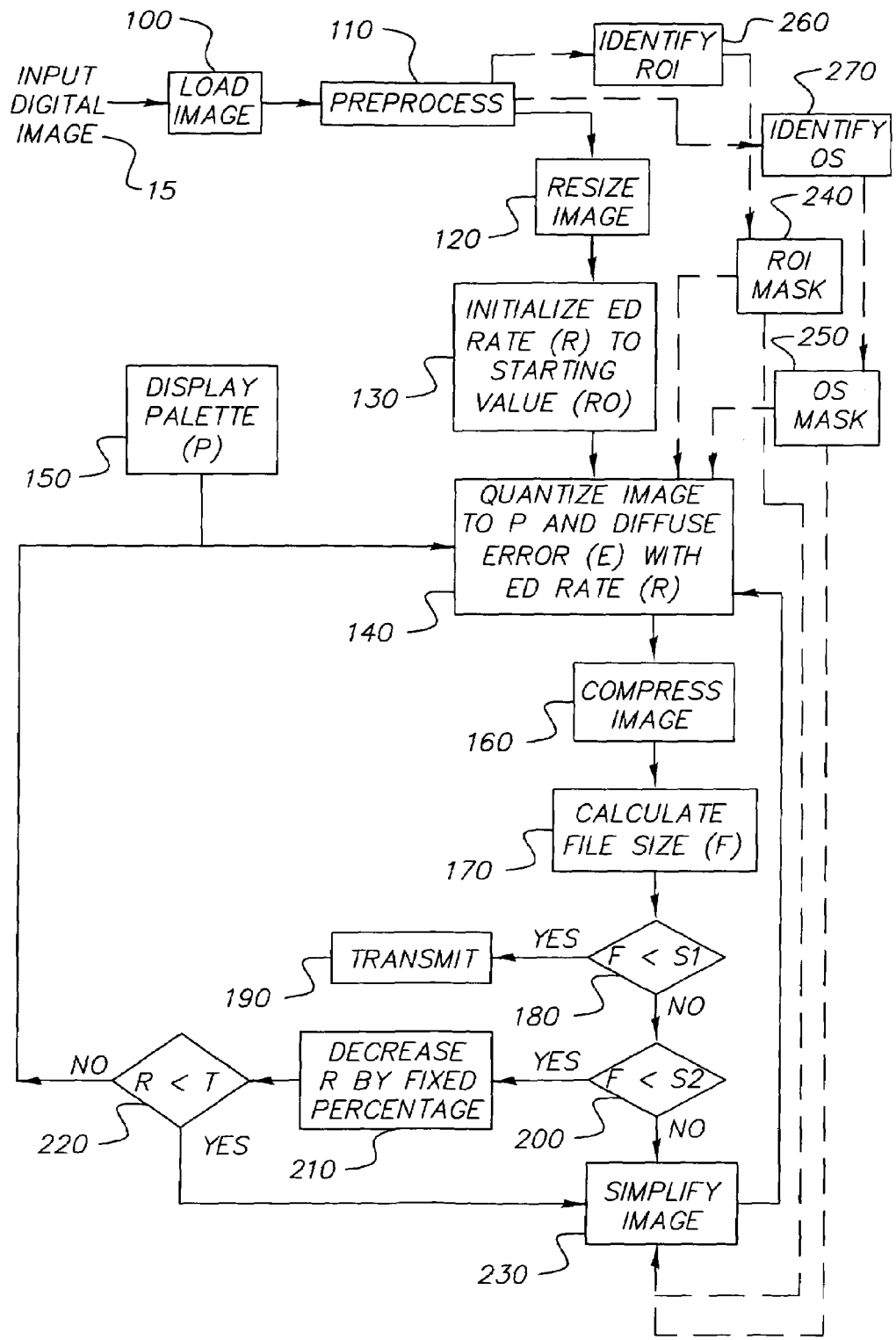
FIG. 1 is a flow diagram illustrating the method of the present invention for generating digital image files for limited displays.

Referring to the method of the present invention shown in FIG. 1, an input digital image 15 is processed to create an output digital image that is transmitted (190). The processing consists of loading (100) the input digital image 15 into a computer program. The image is then preprocessed (110) according to some desired processing scheme to create a preprocessed image. This preprocessing (110) scheme might include, but is not limited to, scene balance, contrast enhancement, sharpening and rotation.

At this point in the method, copies of the preprocessed image are sent to a resizing process (120), a region of interest (ROI) identifier (260), and an open-space identifier (270). The preprocessed images sent to the ROI identifier (260) and the open space (OS) identifier (270) are processed according to a process to be described later. These two identifiers are used to apply additional protection of the ROI and extreme simplification of the smooth regions in the image. These two identifiers, and therefore the current invention, relate to digital image understanding technology, which is understood to mean technology that digitally processes a digital image to recognize and thereby assign useful meaning to human understandable objects, attributes or conditions and then to utilize the results obtained in the further processing of the digital image.

The resizing operator (120) resizes the preprocessed image to create a resized image (according both to the original image aspect ratio and the device pixel ratio). In general, the resizing operator reduces the size of the image because the display resolution is often significantly lower than the resolution of the input image. Good choices for the resizing operator include bi-linear and bi-cubic interpolators, which are well known in the art. Referring to step 130, the error-diffusion (ED) weight (R) is set to a pre-determined initial value corresponding to diffusing close to 100% of the color quantization error. The resized image (from the step 120), the error-diffusion weight (R), and a display palette (P) (provided by stage 150) are input into a quantization and error diffusion process (140). The resized image is quantized to the display palette (P), and the quantization error is diffused according to the diffusion weight (R) and the process referred to in FIG. 3, to produce a quantized image in step 140. The quantized image is compressed (160) using a compression process to create a compressed image. This compression process is based on a lossless compressor such as that found in the PNG specification. The compressed file size (F) is then calculated (170). The compressed file size (F) is compared to a first threshold size (S1) in comparison 180, e.g., to a threshold size of 3 kilo bytes. If the compressed file size (F) is less than the first threshold size (S1), the compressed image is transmitted (190) to the display device. If the compressed file size (F) is greater than (S1), the compressed file size (F) is compared to a second threshold size (S2) in a second comparison 200, e.g., 3.5 kilo bytes. If the compressed file size (F) is less than the second threshold size (S2), the error-diffusion rate (R) is reduced (210) by a fixed percentage, e.g., 10%.

The error-diffusion rate is then compared (220) to a minimum error-diffusion rate threshold T, e.g., a threshold of 50%. If the error-diffusion rate (R) is less than T, an image simplification process (230) is initiated. If the error-diffusion rate (R) is greater than T, the process of quantizing the resized image with error diffusion, using the current value of the error-diffusion weights $W_{i,j}$, computed by multiplying the weight values when R0=100% by the current rate R, is initiated (140) and the method steps 160–200 are repeated.

Figure 7:
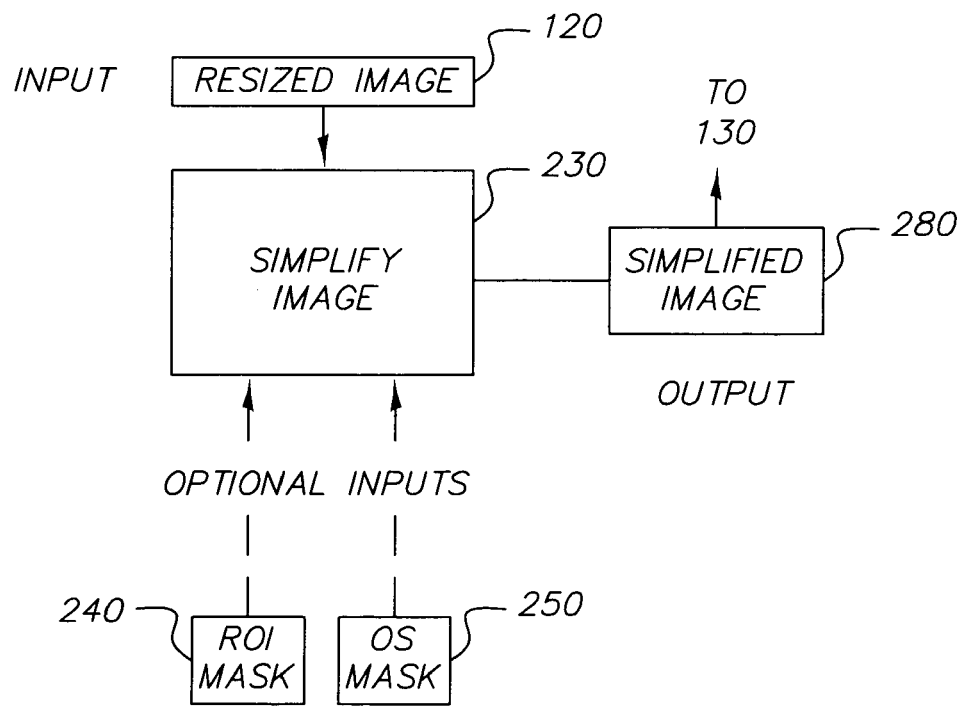
FIG. 7 shows the inputs and output of an image simplification process used in the method illustrated in FIG. 1.

Referring to FIG. 7, the image simplification process (230) requires as its input the resized image (120) and certain optional inputs as indicated by broken line, including the region of interest (ROI) mask (240) and/or the open space (OS) mask (250). The image simplification process (230) returns a simplified image (280) based on application of an image filter, such as the aforementioned sigma filter, to the resized image, which removes, or smoothes, low-magnitude spatial variations, regardless of their frequency content, which appear in more or less flat regions and are perceptually less important than edges of large magnitude. The ROI (240) and OS (250) masks are used in the image simplification process in the following manner. The ROI mask (240) is used to shield certain image regions identified in the ROI mask from the image filtering, such as the sigma filtering; more specifically, those regions in the mask having values equal to one are shielded from the image filtering. The OS mask is used to convert those image regions identified in the OS mask with mask values equal to one to a single color value, such as the mean color value of the region.

The process of iteratively comparing the compressed image file size F to a set of thresholds (S1 and S2) in the comparisons 180 and 200 and selectively lowering the error-diffusion-rate (R) in the reduction step 210, is repeated until either F is less than S1 and the quantized image is transmitted to the display (190), or R is still just greater than T while F is less than S2.

Still referring to FIG. 1, once the resized image is sent to the image simplification process (230) the error-diffusion rate (R) is reset to a starting value (R0) and the process of quantizing the resized and simplified image to the display palette (140) is started again. The process of reducing the error-diffusion rate (R) (210) and simplifying the image (230) are repeated until F is less than S1 and the quantized image is transmitted to the display device (190).

Figure 2:
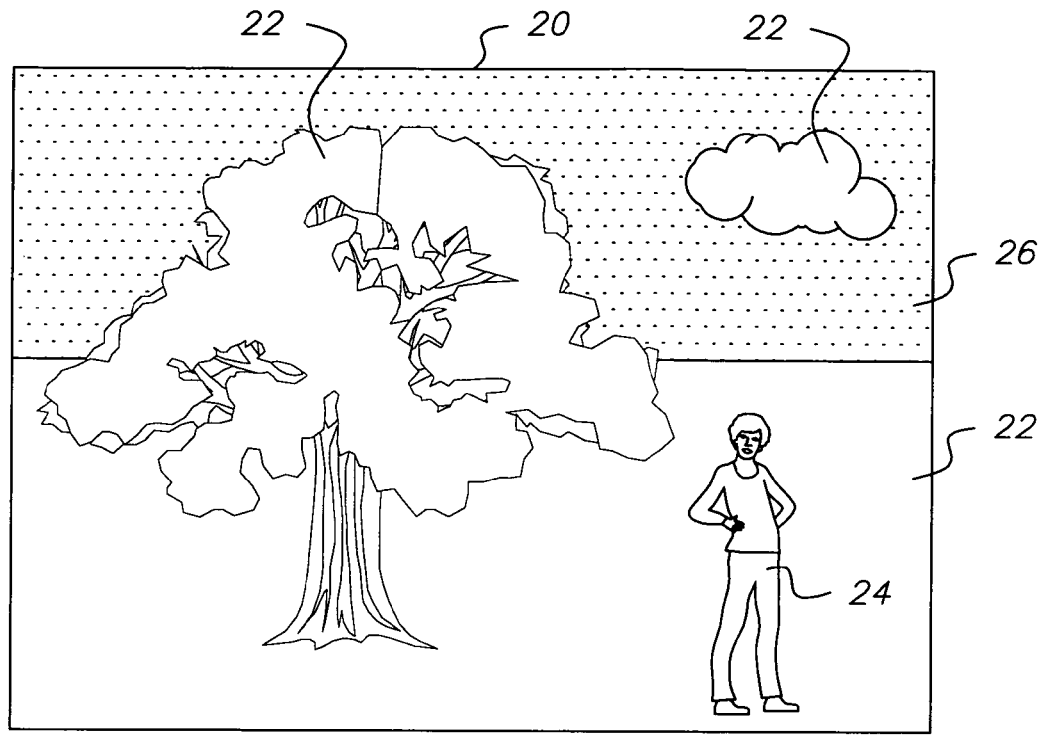
FIG. 2 is a pictorial example that is helpful in illustrating the process and effect of the present invention.

The process and effect of the present invention is illustrated in FIG. 2. An input image 20 is shown which includes a person standing in the foreground along with a tree, while sky, cloud, and grass lawn form the background of the scene. With a fixed device palette, quantization would lead to visually objectionable quantization artifacts such as unrecognizable facial features and heavy contouring in the sky region. Using the present invention, the regions corresponding to cloud, foliage, and lawn are treated as less important regions 22 and receive the most simplification, and the details in these regions are simplified to enable high quality rendering of the more prominent image structures such as the person, horizon, outline of the tree, etc.

In addition, more effective preservation of important image structures can be achieved by object detection. In some cases, an important image structure, such as a human face 24, has relatively subtle features, especially when an image is reduced to a small size.

Figure 6:
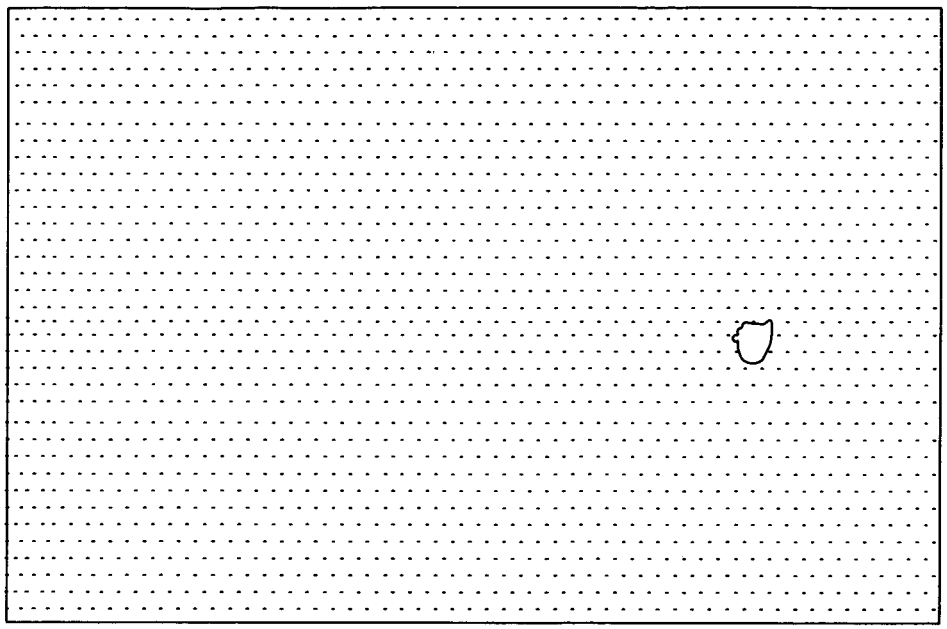
FIG. 6 shows an example of a region of interest (ROI) mask, particularly for a face.

Referring back to FIG. 1, in a preferred embodiment of the present invention, a face detector is utilized to identify (260) a region of interest (ROI) to be protected from image simplification (230). This region of the image is quantized to the display palette using an error-diffusion rate (R) equal to some maximal value deemed appropriate. The ROI defined using the face detector is isolated from the remainder of the image regions by creating a ROI mask (240). Refer to FIG. 6 for an illustration of a ROI mask created from the example image shown in FIG. 2. This mask has the same dimensions as the input image with pixel values equal to one (denoted by the white regions) in the ROI defined by the face detection process and zeros elsewhere (denoted by the black regions). Thus, this mask (240) is used by the image simplification process (230) to identify the regions of the image that are not to be simplified, and by the error diffusion process (140) to apply 100% error diffusion, or a rate approaching 100%, to the regions of interest.

Figure 8:
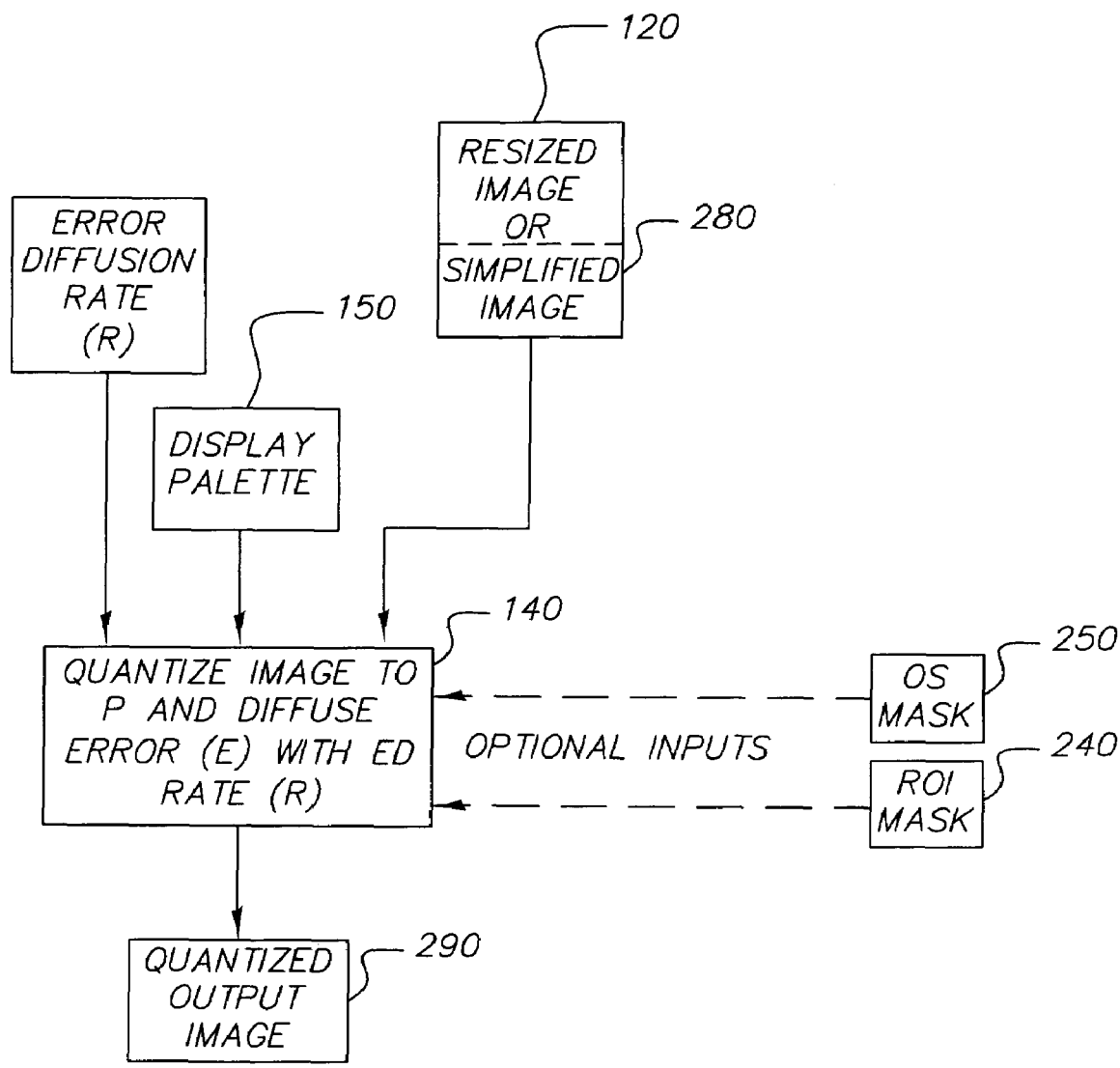
FIG. 8 shows the inputs and outputs of the quantization and error diffusion process used in the method illustrated in FIG. 1.

Referring to FIG. 8, the image quantization process (140) has three required inputs: an error diffusion rate (R), the display palette (150), and either the resized image (120) or the simplified image (280). The OS mask (240) and the ROI mask (250) are optional to the image quantization process and are only used if they are created in the normal flow of the algorithm. If the ROI mask (240) is present, in the quantize and diffuse image process (140), regions in the resized image (120) or in the simplified image (280) corresponding to ones in the ROI mask are quantized to the display palette (150) using an error diffusion process with a diffusion rate (R) set to a maximal value deemed appropriate. If the OS mask (250) is present, the regions of the simplified image (280) are quantized to the display palette using an error diffusion rate (R) set to a minimal value, such as zero. The remaining regions in the image are quantized to the display palette using the error diffusion rate (R) that is currently being used in the process.

Human face detection is well known in prior art: For example, see B. Heisele, T. Poggio, M. Pontil, "Face Detection in Still Gray Images," MIT *Artificial Intelligence Lab*, Memo 1687, May 2000, or alternatively, U.S. Pat. No. 5,710,833 by Moghaddam and Pentland ("Detection, recognition and coding of complex objects using probabilistic eigenspace analysis"), which are incorporated herein by reference.

In addition, more effective simplification of unimportant image structures can be achieved by object detection. For example, it would be extremely efficient for image compression if flat regions, or open space regions, such as sky or floor, are set and later quantized to a single color without applying any error diffusion. Details of open space detection is described in commonly-assigned U.S. Pat. No. 5,901,245 issued May 4, 1999 to Warnick et al., which is incorporated herein by reference.

Figure 5:
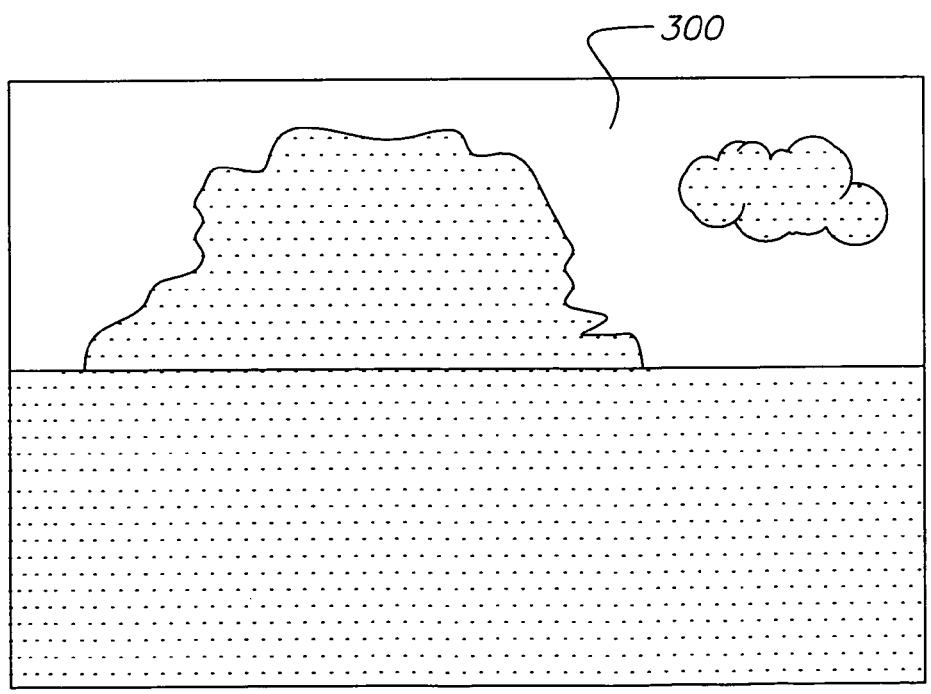
FIG. 5 shows an example of an open space (OS) mask.

Referring back to FIG. 1, in a preferred embodiment of the present invention, an open space detector is used to identify (270) smooth regions in an image. Each of these regions is then converted (or quantized) to a single unique color value that is within the display palette. This process has the effect of reproducing these areas without quantization artifacts such as contour bands or dithering noise associated with error diffusion. As a result, for a given open-space feature, the region is rendered smoothly with a common color that best represents the color within the region. In a similar manner as described for the facial detection and protection process previously described, referring to FIG. 5, a mask (250) is generated that distinguishes open-space regions 300 from the remaining regions in the image. In this example the sky regions (26) shown in FIG. 2 were identified as OS regions 300. Thus, the mask shown in FIG. 5 has ones everywhere there was a sky region and zeros everywhere else. This mask is used to guide special treatment of the open-space regions in both the image simplification (230) and the error-diffusion process (140). In other words, pixels in an open-space region receive the most extreme simplification, i.e., set to a single color, and are then quantized to a single palette color with 0% of error diffusion applied to the entire open-space region.

Referring back to FIG. 2 for a pictorial example of the process and effect of the method according to the invention, the face region 24 is detected and excluded from image simplification to ensure the best rendering of face features. In addition, the sky region is identified as an open space region 26 and subsequently quantized to a single blue color and excluded from the error diffusion process.

In the case when the above-described procedure fails to produce an image file smaller than S1, the rendered image may be cropped at the image borders to the extent that the file size of the cropped image is smaller than S1.

The invention has been described in detail with particular reference to certain preferred embodiments thereof, but it will be understood that variations and modifications can be effected within the spirit and scope of the invention.

PARTS LIST 15 input digital color image
16 set of palette colors
17 palette color assign next step 18 output digital color image
20 an input image
22 image regions to receive most simplification
24 human face region
26 open space region (sky)
30 difference operation
32 weight errors step
34 sum operation
40 current pixel
42 next pixel to the right
44 pixels in next row of image
100 input digital image loading step
110 preprocessing step
120 resizing process
130 error-diffusion weight setting step
140 quantization and error diffusion step
150 display palette
160 compress image step
170 compressed file size calculation step
180 first threshold size comparison
190 transmit image step
200 second threshold size comparison
210 error diffusion rate reduction step
220 minimum error diffusion rate comparison
230 image simplification process
240 region of interest mask
250 open space mask
260 region of interest identifier
270 open space identifier
280 simplified image
300 open space regions

What is claimed is:

1. A method for rendering and compressing a digital image for display on a display device; said display device having a display resolution less than that of the digital image, using a display palette for rendering the digital image, and connecting with a transmission channel imposing a limit on a maximum file size; said method comprising the steps of:
   (a) resizing the digital image to the display resolution to produce a display-sized image;
   (b) quantizing the display-sized image to the display palette with an error diffusion process that produces an error diffused image according to a predetermined error diffusion rate;
   (c) losslessly compressing the error diffused image to produce a compressed image having a file size;
   (d) comparing the file size to the maximum file size and, if the file size is less than the maximum file size, transmitting the compressed image to the display;
   (e) if the file size is greater than the maximum file size, but less than another predetermined file size that is greater than the maximum file size, reducing the error diffusion rate by a predetermined amount in order to reduce the file size and then repeating steps subsequent to step (a) on the display-sized image at the reduced error diffusion rate; and
   (f) if the file size is greater than both the maximum file size and the predetermined file size, simplifying the display-sized image by reducing image detail to produce a simplified image and then repeating steps subsequent to step (a) on the simplified image until the file size is less than the maximum file size.

2. The method claimed in claim 1, further comprising the step of detecting a region of interest in the digital image and in step (f) preventing the simplifying of significant features in the region of interest.

3. The method claimed in claim 2, wherein the region of interest corresponds to a human face and the step of detecting a region of interest employs a face detection algorithm.

4. The method claimed in claim 1, wherein the step (e) of reducing the error diffusion rate comprises the steps of:
   (i) quantizing the display-sized image to the display palette with a reduced error diffusion rate up to a maximum reduction to produce an error diffused image, whereby the maximum reduction corresponds to minimum error diffusion rate threshold; and
   (ii) if the maximum reduction does not produce a file size less than the maximum file size, then simplifying the image according to step (f).

5. The method claimed in claim 1, wherein the step (f) of simplifying the display-sized image comprises applying a sigma filter to the display-sized image.

6. The method claimed in claim 1, further comprising the step of detecting one or more open space regions in the digital image and quantizing each of the open space regions to the same color value in the display palette without applying error diffusion.

7. The method claimed in claim 1, where pre-processing is applied to the digital image prior to the step (a) of resizing.

8. The method claimed in claim 7, where the pre-processing includes brightness, contrast, and/or gamma adjustment.

9. The method claimed in claim 1, where the error diffused image is further reduced in its size by cropping out pixels from the image borders to generate a cropped image, wherein the file size of the cropped image is below the maximum file size.

10. A computer storage medium having instructions stored therein for causing a computer to perform the method of claim 1.

11. A system for rendering and compressing a digital image for display on a display device and transmission on a transmission channel, said display device having a display resolution less than the resolution of the digital image and a display palette for rendering the digital image, the transmission channel further imposing a limit on a maximum file size suitable for transmission, said system comprising:
   a resizing stage for resizing the digital image to the display resolution to produce a display-sized image;
   a quantizer for quantizing the display-sized image to the display palette with an error diffusion process that produces an error diffused image according to a predetermined initial error diffusion rate;
   a compressor for losslessly compressing the error diffused image to produce a compressed image having a particular file size; and
   a processing stage for comparing the particular file size to the maximum file size and (a) if the particular file size is less than the maximum file size, transmitting the compressed image to the display; (b) if the particular file size is greater than the maximum file size, but less than another predetermined file size that is greater than the maximum file size, reducing the error diffusion rate by a predetermined amount in order to reduce the file size and then quantizing and compressing the error-diffused image at the reduced error diffusion rate until the particular file size is less than the maximum file size; and (c) if the particular file size is greater than both the maximum file size and the predetermined file size, simplifying the display image by reducing image detail to produce a simplified image and then quantizing and compressing the simplified image until the particular file size is less than the maximum file size.

12. The system claimed in claim 11, wherein the processing stage further detects a region of interest in the digital image and prevents the simplifying of significant features in the region of interest.

13. The system claimed in claim 12, wherein the region of interest corresponds to a human face and the processing stage employs a face detection algorithm.

14. The system claimed in claim 11, wherein the processing stage applies a sigma filter to simplify the display-sized image.

15. The system claimed in claim 11, wherein the processing stage further detects one or more open space regions in the digital image and quantizes each of the open space regions to the same color value in the display palette without applying error diffusion.

16. A method for rendering and compressing a digital image to a display resolution less than that of the digital image, said method comprising the steps of:
   resizing the digital image to the display resolution to produce a display-sized image;
   quantizing the display-sized image with an error diffusion process that produces an error diffused image according to a predetermined error diffusion rate;
   compressing the error diffused image to produce a compressed image having a file size;
   comparing the file size to the maximum file size and, if the file size is less than the maximum file size, transmitting the compressed image to the display;
   if the file size is greater than the maximum file size, but less than another predetermined file size that is greater than the maximum file size, reducing the error diffusion rate by a predetermined amount in order to reduce the file size and then repeating steps subsequent to said resizing step on the display-sized image at the reduced error diffusion rate; and
   if the file size is greater than both the maximum file size and the predetermined file size, simplifying the display-sized image by reducing image detail to produce a simplified image and then repeating steps subsequent to said resizing step on the simplified image until the file size is less than the maximum file size.

17. The method of claim 16 wherein said quantizing is to a predetermined display palette.

18. The method of claim 16 wherein said compressing is lossless.

19. A system for rendering and compressing a digital image to a display resolution less than the resolution of the digital image, said system comprising:
   a resizing stage resizing the digital image to the display resolution to produce a display-sized image;
   a quantizer quantizing the display-sized image with an error diffusion process that produces an error diffused image according to a predetermined initial error diffusion rate;
   a compressor compressing the error diffused image to produce a compressed image having a particular file size; and
   a processing stage comparing the particular file size to the maximum file size and (a) if the particular file size is less than the maximum file size, transmitting the compressed image to the display; (b) if the particular file size is greater than the maximum file size, but less than another predetermined file size that is greater than the maximum file size, reducing the error diffusion rate by a predetermined amount in order to reduce the file size and then quantizing and compressing the error-diffused image at the reduced error diffusion rate until the particular file size is less than the maximum file size; and (c) if the particular file size is greater than both the maximum file size and the predetermined file size, simplifying the display image by reducing image detail to produce a simplified image and then quantizing and compressing the simplified image until the particular file size is less than the maximum file size.

20. The system of claim 19 wherein said quantizing is to a predetermined display palette and said compressing is lossless.

* * * * *